Feb. 26, 1929.

J. B. ROSEFIELD

INSECT POISON CONTAINER

Filed Nov. 7, 1927

1,703,210

Inventor.
JOHN B. ROSEFIELD
Jno. M. Naylor
Attorney.

Patented Feb. 26, 1929.

1,703,210

UNITED STATES PATENT OFFICE.

JOHN B. ROSEFIELD, OF PIEDMONT, CALIFORNIA.

INSECT-POISON CONTAINER.

Application filed November 7, 1927. Serial No. 231,728.

My invention relates to an insect trap or insect poison container, whereby the contents are made easily accessible to such insects as may be attracted thereto and yet are maintained inaccessible to such animals as may be injured by contact with or consumption of the contents.

The apparent improvement, over the existing devices of this nature, which will be found in my device, is the greatly reduced cost of manufacture, an all-important element in such articles, without detracting from its efficiency in performing the particular function or purpose for which it has been designed.

The device is of such simple construction as to permit ready cleaning and the possibility of its getting out of order is exceptionally remote.

One form of my invention is shown in the accompanying drawing, in which.

Figure 1:
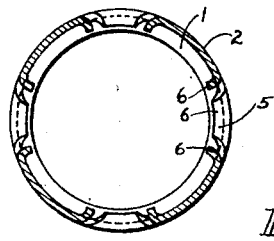
Figure 1, is a top plan sectional view of the screw cap, taken on the line 1—1 of Figure 2, showing the detailed construction of the parts.
Figure 2:
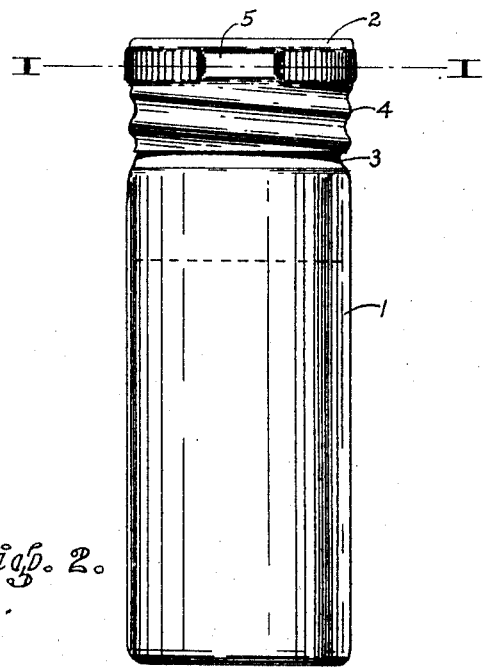
Figure 2, is a vertical plan view of the device in assembled form.

With reference to the numerals appearing in the drawings:

The numeral 1, in Figure 2, indicates a jar adapted to contain the insect poison, covered with a screw cap 2, both the jar 1 and cap 2 being provided with the ordinary male and female screw threads 3 and 4, respectively. At 5 in Figure 2, is shown one of the rectangular-shaped periferal ports, which are the entrances through which the attracted insects have access to the contents of the jar. The ports 5 are shown placed directly above the top-most screw-thread 4 of the cap 2, in Figure 2, the purpose of which is that the lower horizontal inwardly-bent flare or stop 6, as shown in Figure 1, acts as a stop for the cap 2 when the same is being screwed on the jar, thus preventing complete or even a partial closure of the ports 5 at any time.

In Figure 1, is shown a top plan sectional view of the screw cap for the purpose of clearly showing the flares 6 and their relation to the port 5. It will be noted in this view that the lower horizontal inwardly-bent flare is resting on top of the mouth of the jar 1.

Figure 3:
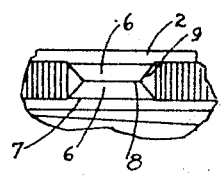
Figure 3, is a view showing the manner in which the ports are formed.

One method of producing the ports is shown in Figure 3. A rectangle of desired dimensions is prescribed on the cap 2 as shown by the line 7 denoting the area of the rectangle; next a horizontal cut is made through the cap midway between the top and bottom of the rectangle and extending not quite to either side of the same as shown by the line 8; then a short angular cut 9 is made from a corner of the rectangle toward the nearest terminus of the line 8; a similar cut is made from the terminus of the line 8 back to corner directly below the corner referred to. This operation is then repeated on the opposite end of the rectangle. As a result the rectangle is then divided into four angular flares 6 all hinged at the line 7. The flares 6 are then pushed inwardly until each is at right angles to the wall of the cap, the lower horizontal flare serving as the stop feature for the cap.

The attracted insects crawl up the side of the jar and enter through the ports, 5, partake of the poison contained therein and either escape through the ports 5, or are overcome by the poison and become immersed therein. This, of course, depends largely on the type of poison employed, whether it be of a quick acting nature or the contrary. It may be found more feasible to use a poison slow in taking effect, especially where a small container is used, since it is obvious that a larger number of insects could then be exterminated. However, that is a matter of choice and I therefore do not wish to be limited to any specific size of device, nor make any such limitation as is not warranted in view of the prior art.

I claim:

1. In an insect trap, the combination with a poison container having a screw-threaded top part provided with an opening to the interior of the container, of a cap having a flange screw-threaded adjacent to the edge thereof to engage the screw-threaded top part of the container, the flange having a plain annular part between the screw-threaded part thereof and the crown of the cap, said plain annular part having ports therethrough to provide passages through the engaged cap to the opening in the top part of the container, and stops projecting from the inner face of the flange adjacent to the outer edge of the plain annular part, said stops operating to abut the top edge of the container to limit the turning movement of the cap onto the container top part to prevent closing of the ports by the container wall when the cap is screwed onto the container.

2. In an insect trap, the combination with a poison container having a screwthreaded top part provided with an opening to the interior of the container, of a cap having a flange screw-threaded to engage the screw-threaded top part of the container, stops projecting from the inner face of the flange and spaced from the crown of the cap, said flange having ports therethrough between the crown of the cap and said stops, said stops operating to abut the top edge of the container to limit the turning movement of the cap onto the container top part to prevent closing of the ports by the container wall when the cap is screwed onto the container.

JOHN B. ROSEFIELD.